United States Patent [19]

Cutler

[11] 3,720,786

[45] March 13, 1973

[54] CONDITIONAL REPLENISHMENT VIDEO ENCODER WITH PREDICTIVE UPDATING

[75] Inventor: Cassius Chapin Cutler, Holmdel, N.J.

[73] Assignee: Bell Telephone Laboratories, Incorporated, Murray Hill, N.J.

[21] Appl. No.: 144,761

[52] U.S. Cl.........178/7.1, 178/DIG. 3, 179/15.55 R, 325/38 B

[51] Int. Cl...............................................H04n 7/12

[58] Field of Search..........178/6.8, 17.2, DIG. 3, 7.1; 179/15.55 R, 15 BW; 325/38 B

[56] References Cited

UNITED STATES PATENTS 3,553,361 1/1971 Mounts..................................178/6

OTHER PUBLICATIONS

Kortman – Redundancy Reduction – A Practical Method of Data Compression – Proc. of IEEE Vol. 55 No. 3 March 1967

*Primary Examiner*—Robert E. Griffin
*Assistant Examiner*—Joseph A. Orsino, Jr.
*Attorney*—R. J. Guenther and E. .W. Adams, Jr.

[57] ABSTRACT

Each new sample from a video signal is compared with a sample derived from a frame memory having the same spatial point location in the video frame. If a significant difference exists, the new sample replaces the old sample in the frame memory and is stored in a buffer memory. The frame memory is composed of three delay lines connected in tandem having delay values such that the samples preceding and following the center delay line correspond to spatial points above and below the sample being compared. If a significant difference exists and if the buffer memory is filled to a predetermined level, the samples preceding and following the center delay line are also predictively updated with values derived from the value of the new sample. Different functions are used to predictively update during the even and odd fields and greater differences are required to exist before they are deemed to be significant during the even fields in order to avoid the creation of an unstable condition.

15 Claims, 5 Drawing Figures

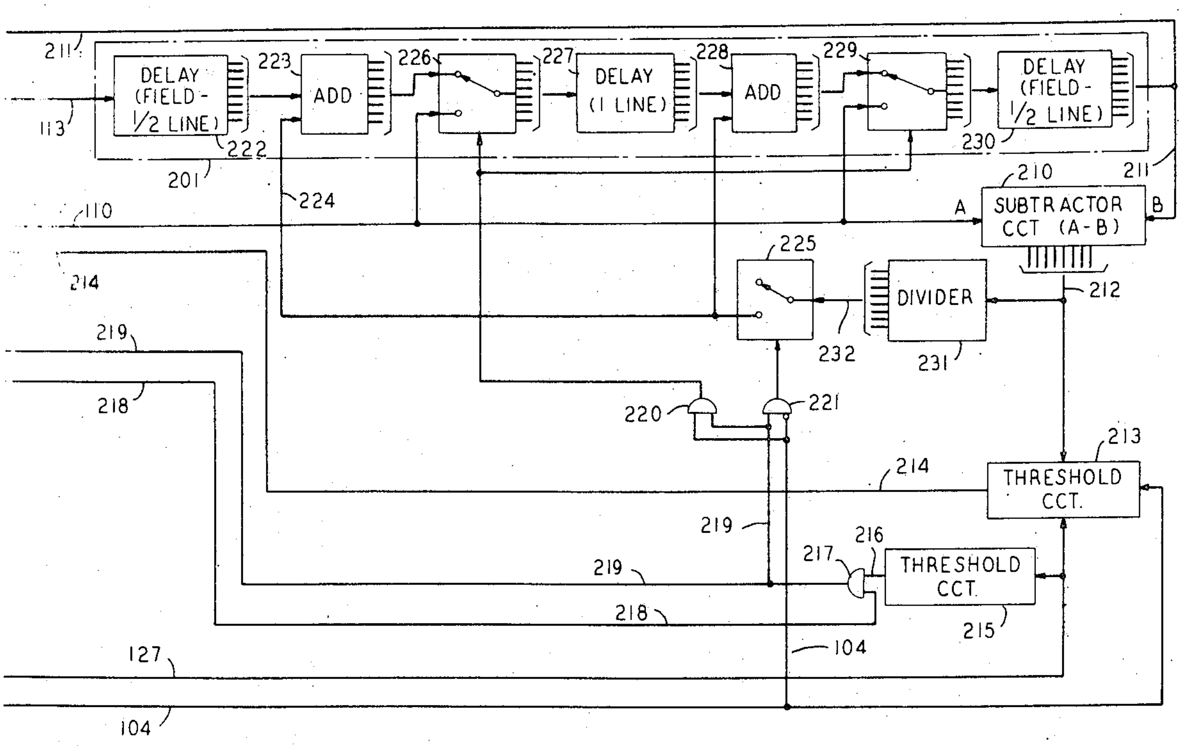
DELAY (FIELD - 1/2 LINE)
ADD
DELAY (1 LINE)
ADD
DELAY (FIELD - 1/2 LINE)
SUBTRACTOR CCT (A-B)
A
B
DIVIDER
THRESHOLD CCT.
THRESHOLD CCT.
211
113
222
201
223
226
227
228
229
230
210
211
110
224
225
214
212
219
218
232
231
220
221
213
214
219
216
217
219
218
215
104
127
104

INVENTOR
C. C. CUTLER
BY Daniel D. Dubosky
ATTORNEY

CONDITIONAL REPLENISHMENT VIDEO ENCODER WITH PREDICTIVE UPDATING

BACKGROUND OF THE INVENTION

This invention relates to redundancy reduction systems and, more particularly, to redundancy reduction systems that are useful in processing video signals.

Video signals that are generated in video telephone systems have a high degree of correlation between the picture elements of succeeding frames. To utilize this fact in reducing the number of bits which must be transmitted, redundancy reduction systems have been designed in which a sample from the video signal is transmitted to the receiving location only if that sample represents a change in amplitude for its corresponding spatial point in the video frame. This type of system is disclosed in U.S. Pat. No. 3,571,505 of Mar. 16, 1971 to Frank W. Mounts. In this system, an entire frame of picture element amplitudes is stored in a frame memory and each new sample from the video signal is compared with its corresponding amplitude from a previous video frame in order to determine whether or not that sample should be transmitted. Since the samples which are selected for transmission occur at a variable rate, a buffer memory is utilized to interface the selected samples with a transmission channel operating at a constant bit rate. To prevent overflow of the buffer memory, the number of words stored in the buffer memory is utilized as a parameter in setting the threshold level which determines whether or not a change in amplitude at a spatial point warrants transmission of the new sample to the receiving location. To reduce the number of bits which must be both stored in the buffer memory and transmitted to the receiving location, the system in the above-identified Mounts patent transmitted an address word which locates the sample within a video line only. Placement in the video frame is achieved by maintaining synchronism between transmitting and receiving locations through the forcible transmission of the first picture element in each video line.

In order to achieve even further reductions in the number of bits which must be transmitted, Frank W. Mounts invented and patented still other systems in which the number of bits utilized for addressing purposes was decreased. For example, in U.S. Pat. No. 3,553,361 of Jan. 5, 1971 to Frank W. Mounts, a single address word is transmitted with a cluster of amplitude words when changes are found to occur in a sequence of picture elements. A flag word at the end of the sequence of amplitude words identifies the end of the run of samples associated with the single address.

The techniques described in the above-identified patents to Mounts are equally applicable to both sequential and interlace type video systems. As is well known in the art, a sequential system is one in which each video line is preceded in time by the video line immediately above it in the spatial format of the video frame. In the interlace type system, a video frame is subdivided into at least two intervals commonly called fields. Each field contains approximately one-half of the total number of lines in a video frame and the lines of each field are interlaced with those of the other field such that adjacent lines in the spatial format of the video frame belong to different fields. Because of the spatial proximity of adjacent lines in an interlaced video system, a high degree of correlation also exists between the picture elements in one video line with the picture elements in the adjacent video line even though these picture elements belong to a different field.

In the systems described in the above-identified patents to Frank W. Mounts, the number of words or bits stored in the buffer memory is utilized as a parameter in controlling the number of samples which are selected for transmission. As the number of words stored in the buffer memory increase towards the maximum capacity of the buffer memory, a larger and larger difference is required between the sample and its previously stored amplitude from the frame memory before the sample is selected for transmission to the receiving location. In this way, overflow of the buffer memory is prevented. At some predetermined high level of storage in the buffer memory, selection of all samples is prohibited except for those samples which must be transmitted for synchronization purposes. The buffer memory tends to fill toward its maximum capacity during intervals in which a large number of changes have occurred between succeeding video frames. This usually occurs during intervals when movement has occurred in the picture. It may occur sometimes when a change in illumination occurs throughout the entire picture. In either case, the quality of the transmitted picture tends to deteriorate as the buffer memory fills toward its maximum capacity.

SUMMARY OF THE INVENTION

A primary object of the present invention is to utilize the correlation between picture elements of succeeding fields to reduce the number of bits which must be transmitted to designate the amplitude values in a redundancy reduction system. Still another object of the present invention is to utilize this correlation to decrease the number of amplitude bits in a system which can readily incorporate the above-identified inventions of Frank W. Mounts so as to reduce both the number of amplitude and address bits which must be transmitted to the receiving location.

In accordance with the present invention, detection of a significant change in a picture element value at a spatial point in one of two interlaced fields, in addition to the usual updating of that element in the frame memory, causes the stored picture element values for the spatial points in the other field above and below the spatial point under consideration to be updated with new values. This is done providing the buffer memory has reached a predetermined level of fullness. Below this predetermined level, a redundancy reduction system constructed in accordance with the present invention operates in a fashion identical to that disclosed in the prior art. In the arbitrarily designated odd fields of the video signal, the amplitude values in the frame memory are updated by the addition of a fractional part of the detected change whereas during the even fields the amplitude values in the frame memory are replaced by the amplitude value for the picture element presently under consideration. As a result, any detailed pattern that may be left uncorrected by updating with only a fractional part of the change is completely corrected during the even fields when the entire new amplitude is inserted for the amplitude values in the frame memory.

In accordance with a feature of the present invention, the threshold values utilized during the even fields are caused to be higher than those which are utilized during the odd fields for any given level of fullness in the buffer memory. As a result, any errors introduced into the amplitude values for the even fields are not reintroduced into the odd fields and some conditions of instability are thereby avoided.

BRIEF DESCRIPTION OF THE DRAWINGS

The operation of the invention will be more readily understood when the following detailed description is read in conjunction with the drawings in which.

DETAILED DESCRIPTION

Figure 1:
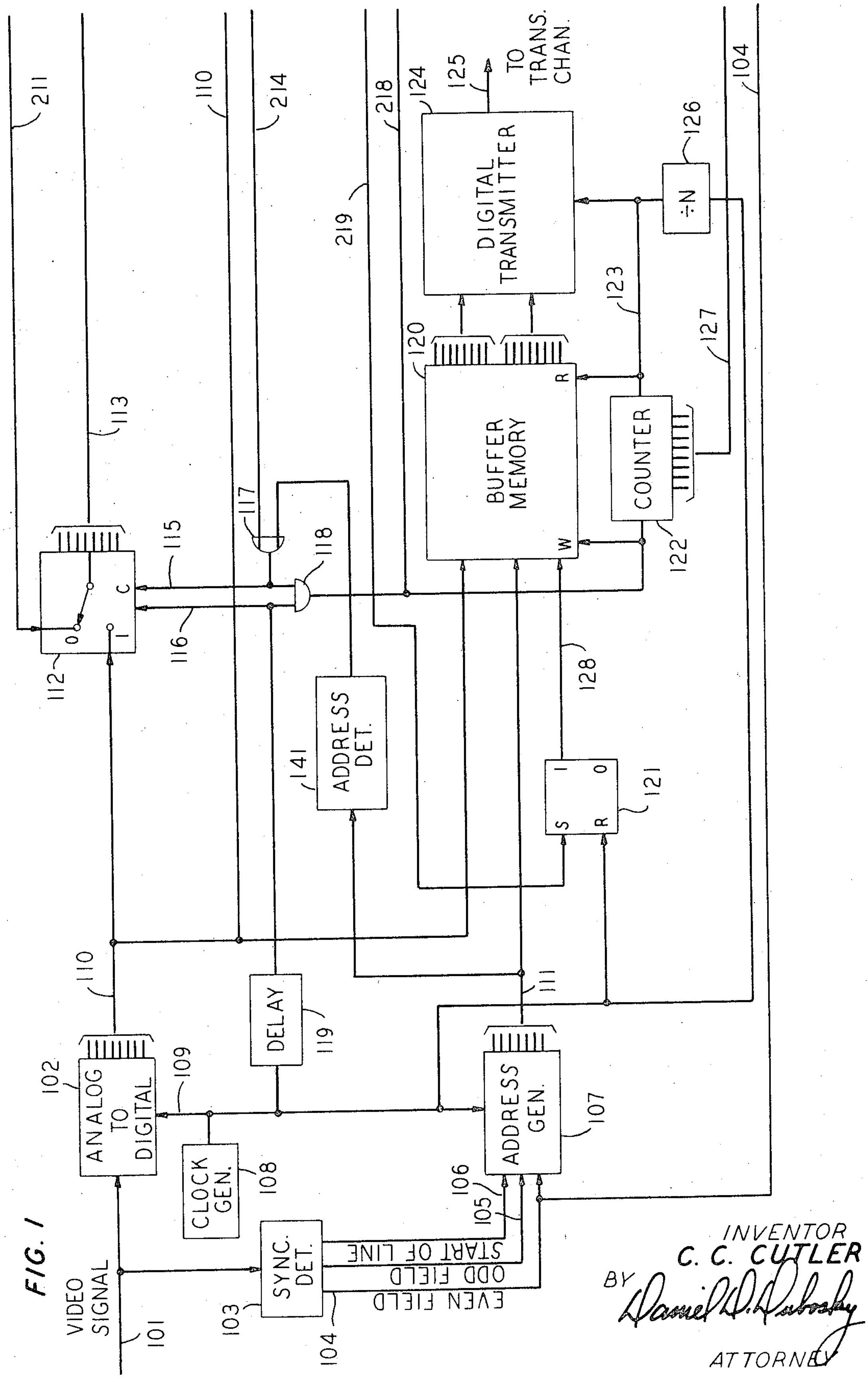
FIGS. 1 and 2 when joined by connecting the identically designated lines (with FIG. 1 to the left of FIG. 2) show a schematic block diagram of one embodiment of the present invention.

In FIG. 1, a video signal is coupled by way of line 101 to the input of an analog-to-digital converter 102 and a sync detector 103. This video signal is of a standard format having frames, fields and lines interspersed with horizontal and vertical blanking intervals. Sync detector 103, in response to the horizontal and vertical blanking intervals, produces an energizing signal on line 104 to indicate fields of one type (designated hereinafter as even fields), and an energizing signal on line 105 to indicate fields of the other type (designated hereinafter as odd fields). At the termination of each horizontal blanking interval between successive lines, a voltage pulse is produced on line 106 by sync detector 103. The energizing signals on lines 104, 105 and 106 are coupled to the input of an address generator 107.

A clock generator 108 provides voltage impulses on line 109 at a rate equal to that at which the video samples are to be taken of the video signal on line 101. In response to each voltage impulse on line 109, analog-to-digital converter 102 provides an 8-bit digital word on bus 110 whose value indicates the amplitude of the video signal on line 101 during the occurrence of the voltage impulse on line 109. Bus 110, like all other lines referred to hereinafter as buses, is actually constructed of a plurality of transmission paths, one for each of the bits in the digital word said to be carried by the bus.

Address generator 107 also responds to each voltage impulse on line 109 in order to produce a 7-bit digital word on bus 111 whose value indicates the position of the corresponding sample on bus 110 within the video line. Each start of line pulse on line 106 resets address generator 107 to its zero position at the termination of each horizontal blanking interval. In addition, initiation of the energizing signals on lines 104 and 105 causes address generator 107 to generate distinctive digital words on bus 111 that can be recognized by the receiver as indications that the samples to be transmitted following these distinctive words belong to either an even or an odd field. An address detector 141 responds to these distinctive words and to the start of line address and develops an energizing signal at its output during their occurrence. This energizing signal ensures their transmission to the receiving location.

Each amplitude digital word on bus 110 is coupled to one input of a digital switch 112. Although digital switch 112 is shown symbolically as a single pole double throw switch to indicate the nature of its operation, it is actually constructed of a plurality of logic gates. Switch 112 connects its output bus 113 either to bus 110 at its first input or to a bus 211 at a second input. The connection to be established by switch 112 is determined by the logical state of the signal on a line 115. If line 115 presents a logical "0" to the control input of switch 112, the digital word on bus 211 is coupled through to bus 113 when a voltage pulse is presented on line 116 at the timing input of switch 112. If, on the other hand, a logical "1" is presented by line 115 to the control input of switch 112, the digital word on bus 110 is coupled through to bus 113 when the voltage pulse is presented on line 116. Hence, the digital words are coupled through to the output bus 113 when the timing signal is presented on line 116 and the particular digital word that is chosen depends on the logical state of the signal provided by line 115 at the control input of switch 112. It is, of course, to be understood that the transmission paths present in each of the buses 110 and 211 will be connected through to their corresponding transmission paths of output bus 113.

Figure 2:
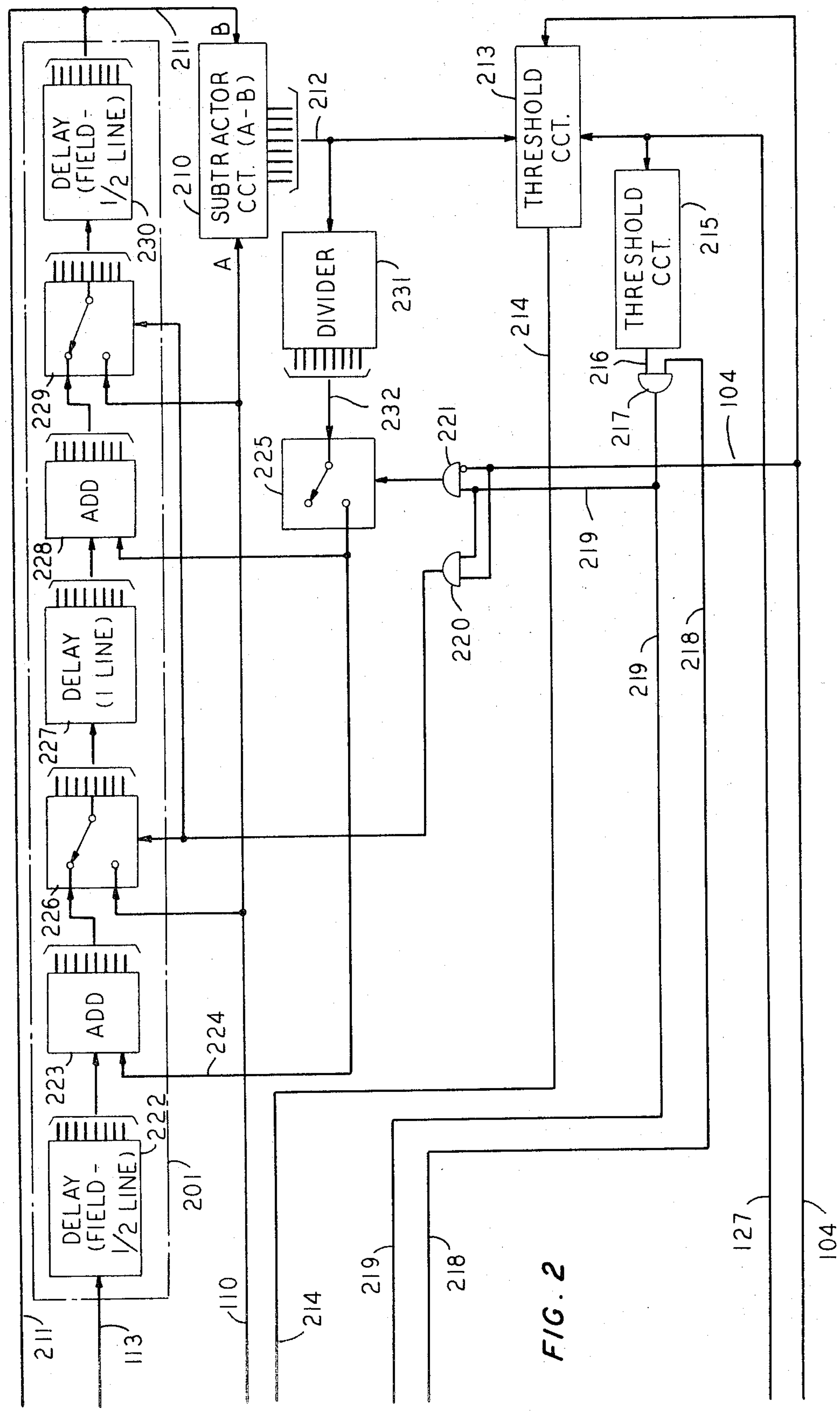

The amplitude word on bus 110 is also coupled to one input of a subtractor circuit 210 in FIG. 2. The second input of subtractor 210 is coupled to receive the digital word provided on bus 211 at the output of a frame memory 201. As will be explained hereinafter, frame memory 201 contains digital words which indicate by their values the amplitude for each of the picture elements within an entire video frame. The entire delay of frame memory 201 is constructed and maintained such that a picture element presented at the input of frame memory 201 on bus 113 appears at the output of frame memory 201 on bus 211 after an interval of time exactly equal to one video frame. Accordingly, the digital word which is presented to one input of subtractor circuit 210 by analog-to-digital converter 102 corresponds to the same spatial point location in the video frame as the digital word presented at the second input of subtractor circuit 210 by way of bus 211. If no change in video signal amplitude has occurred at that spatial point, the digital words present on buses 110 and 211 will be equal in value. If a change has occurred at their corresponding spatial point in the video frame, the digital words on buses 110 and 211 will be unequal in value and the difference between the digital word on bus 110 and the digital word on bus 211 is provided on bus 212 at the output of subtractor circuit 210. This difference digital word on bus 212 is coupled to one input of a threshold circuit 213. In a manner to be described hereinafter, threshold circuit 213 determines whether the digital difference word on bus 212 is sufficiently large so as to warrant transmission of the sample on bus 110 to the receiving location. If transmission is deemed to be warranted, threshold circuit 213 produces an energizing signal on line 214. This energizing signal is coupled to one input of an OR gate 117 in FIG. 1. The output of OR gate 117 is coupled both to the control input of switch 112 and to one input of an AND gate 118.

Hence, if threshold circuit 213 indicates that the difference digital word on bus 112 is significant by generating an energizing signal on line 214, the corresponding logical "1" provided at the control input of switch 112 causes that switch to couple with digital word from bus 110 to the input of frame memory 201 when the energizing voltage pulse is provided on line 116. An energizing pulse is provided on line 116 a predetermined interval of time equal to the delay provided by delay network 119 after an energizing pulse is provided by clock 108 on line 109. The delay provided by network 119 is substantially shorter than the interval between succeeding pulses on line 109 but is long enough in duration so as to permit subtractor circuit 210 and threshold circuit 213 to make a determination as to whether or not a significant change has occurred.

Lines 115 and 116 are also coupled to the inputs of an AND gate 118. As a result, each time that a logical "1" is provided on line 115, the energizing pulse on line 116 is coupled by way of AND gate 118 to the write input of a buffer memory 120. In response to this energizing pulse at its write input, buffer memory 120 couples the amplitude digital word on bus 110, the address digital word on bus 111, and a logical state from a flip-flop 121 into the buffer memory. As will be described hereinafter, the logical state of flip-flop 121 is transmitted to the receiver as the eighth bit of the 7-bit address word in order to indicate whether or not amplitude values within the frame memory are to be updated or altered.

The energizing pulse at the write input of buffer memory 120 is also coupled to the input of a counter 122 and causes that counter to advance its internal count by one. A second input of counter 122 is connected by way of line 123 to the read input of buffer memory 120. Each energizing pulse on line 123 decreases the internal count of counter 122 by one and, in addition, causes a complete amplitude and address digital word (including the state of flip-flop 121) to be coupled out of buffer memory 120 into a digital transmitter 124. These digital words are then coupled by digital transmitter 124 in either parallel or serial form to a receiving terminal by way of a transmission channel 125.

The clock pulses on line 109 from generator 108 are divided by a divider circuit 126 in order to provide the energizing pulses on line 123. These energizing pulses are also coupled to the digital transmitter 124. The integral value of division by divider circuit 126 determines the bit rate reduction provided by the redundancy reduction system. In the present embodiment, where eight bits are utilized for the amplitude word on bus 110, seven bits are utilized for the address word on bus 111 and an additional bit from flip-flop 121 is transmitted with each sample; dividing by an integral value of eight provides a bit rate reduction of four to one.

The operation of the system which has been thus far described, with the exception of flip-flop 121, is identical to the conditional replenishment video systems which have been described in the above-identified patents to Mounts. Each sample generated at the output of the analog-to-digital converter is compared with a sample from the output of the frame memory and if the comparison indicates that a significant change has occurred, the sample along with its address is coupled into a buffer memory in readiness for transmission to a receiving location. The digital word provided on bus 127 at the output of counter 122 indicates the number of words presently being stored within buffer memory 120. This digital word indicating buffer queue length is coupled by way of bus 127 to an input of the threshold circuit 213 in FIG. 2. The buffer queue length, or level of fullness in the buffer memory, is utilized by threshold circuit 213 to increase the threshold level as the buffer memory 120 fills toward its maximum capacity. The range of threshold values established within threshold circuit 213 for the entire range of buffer queue length is illustrated in FIG. 3.

Figure 3:
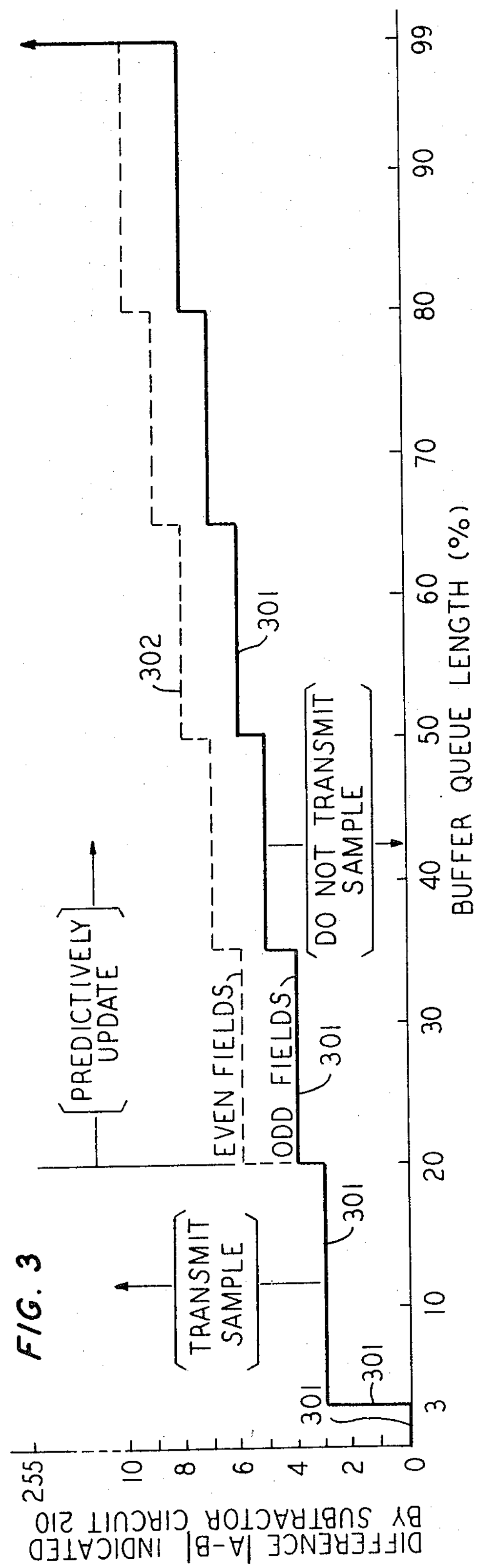
FIGS. 3, 4 and 5 show graphs useful in explaining the operation of the present invention.

Curve 301 in FIG. 3 provides the threshold levels which must be exceeded by the difference digital words on bus 212 for various levels of fullness in buffer memory 120 before a sample is selected for transmission. As indicated by curve 301, buffer queue lengths of less than three percent of maximum buffer memory capacity require no difference at all before an energizing signal is generated on line 214 by threshold circuit 213. This limited range of forcible transmission without regard to any detected difference is provided in order to insure that the buffer memory will always contain a sufficient number of samples so as to provide information to the digital transmitter during the entire vertical blanking interval. As a result, perfectly still pictures with very few changes from one frame to the next will have their picture elements updated with amplitude values even though no significant change has occurred in the amplitudes of the spatial points within the video frame. With small amounts of movement, however, more samples are selected for transmission and the buffer memory generally operates between the levels of three to twenty percent of maximum capacity. In this range, any difference between the two amplitudes tested by subtractor circuit 210 that exceeds the value of three is caused to generate an energizing signal on line 214, which in turn causes the new amplitude to be both coupled into the buffer memory and into frame memory 201. Up to a buffer queue length of 20 percent, the present apparatus operates in a fashion identical to that which was described in the above-identified patents to Mounts.

As increased amounts of movement occur in the picture, the buffer memory fills with digital words in excess of 20 percent of its maximum capacity. The fact that the digital word on bus 127 exceeds 20 percent of buffer memory capacity is recognized by a threshold circuit 215. For all buffer queue lengths in excess of 20 percent of the maximum capacity, threshold circuit 215 provides an energizing signal at its output on line 216. This energizing signal on line 216 energizes one input of an AND gate 217. The other input of AND gate 217 is coupled by way of line 218 to the output of AND gate 118. As pointed out hereinabove, an energizing signal is developed at the output of AND gate 118 when threshold circuit 213 determines that transmission of the new sample is warranted. Hence, if a new sample is selected for transmission and if the buffer queue length exceeds 20 percent of maximum buffer capacity, AND gate 217 generates an energizing signal on line 219.

Line 219 is connected to one input of each of two AND gates 220 and 221. The other input of AND gate 220 and an inhibit input of AND gate 221 are connected to line 104 which originates at the sync detector 103 in FIG. 1. As pointed out hereinabove, sync detector 103 provides an energizing signal on line 104 during the intervals when the samples from the even fields are being presented on bus 110. Consequently, an energizing signal on line 104 during the even field intervals will energize gate 220 and inhibit the operation of gate 221. Accordingly, any energizing pulse produced on line 219 as a result of a significant change during the odd field intervals will be coupled through gate 221 and through gate 220 during the even field intervals.

Frame memory 201, unlike the frame memories in prior art conditional replenishment systems, is constructed of a plurality of delay lines interconnected by logical gates. Each input digital word provided on bus 113 is coupled to the input of a delay circuit 222 which provides a delay for each of the bits in the digital word equal to one field interval less one-half of a line interval. Delay circuit 222 (like delay circuits 227 and 230 which follow) is actually constructed of a plurality of delay lines, one for each of the bits said to be present in the digital word provided at its input by bus 113. The digital word at the output of delay circuit 222 is coupled to one input of an addition circuit 223. The other input of addition circuit 223 is coupled by way of bus 224 to the output of a switch 225. When switch 225 is activated, it presents a digital word on bus 224 which is added to the word presented to the addition circuit 223 by delay circuit 222. If switch 225 is not activated, a digital word having the value of zero is coupled by way of bus 224 to the addition circuit 223.

The digital word at the output of the addition circuit 223 is coupled to one input of a switch 226. Switch 226 normally remains in a position whereby the digital word from addition circuit 223 is coupled through switch 226 to the input of a delay network 227. If, on the other hand, switch 226 is activated, the digital word present on bus 110 is coupled through to the input of delay circuit 227. The delay provided by delay circuit 227 is equal to one line interval. The digital word from the output of delay circuit 227 is coupled to one input of a second addition circuit 228. Addition circuit 228, like the addition circuit 223, has a second input connected to the output of switch 225. Addition circuit 228 acts in an identical fashion to that of addition circuit 223 except that the digital word on bus 224 is added to the digital word at the output of delay circuit 227 by addition circuit 228. The digital word at the output of addition circuit 228 is coupled to one input of a switch 229, the other input of which is coupled to bus 110. Switch 229 acts in a fashion identical to that of switch 226 in selecting either the digital word provided by an addition circuit or the digital word provided on bus 110. The output of switch 229 is connected to a delay circuit 230 which provides a delay equal to the delay provided by delay circuit 222.

Figure 4:
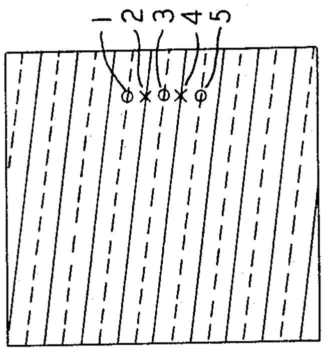

The various picture element amplitudes present at each of the points within frame memory 201 can best be described by referring to the spatial format of a video frame shown in FIG. 4. The solid lines in FIG. 4 represent the lines of video during the odd fields and the dotted lines in FIG. 4 represent the lines of scanned video during the even fields. The number of lines shown in FIG. 4 has been considerably reduced from the number actually present in a working video system in order to illustrate more clearly the operation of the present invention. Scanning of the video image takes place in the normal fashion, from left to right during each video line and from top to bottom during each video field. As shown in FIG. 4, the lines during the even field are interlaced with the lines from the odd field.

During the instant when a digital word is present on bus 110 representing the picture element amplitude at a spatial point designated as 2 in FIG. 4, the stored amplitude for the spatial point designated as 3 is available at the output of delay circuit 222. This picture element amplitude available at the output of delay circuit 222 represents the picture element amplitude which was stored for that spatial point during some previous frame interval. During this same instant, the amplitude stored for the spatial point designated as point 1 in FIG. 4 is available at the output of delay circuit 227. Finally, a stored amplitude representing the picture element amplitude for the spatial point designated as 2 in FIG. 4 is available on bus 211 at the output of delay circuit 230. Assuming that this amplitude represented by the digital word on bus 211 is significantly different from the amplitude represented by the digital word on bus 110, an energizing signal is presented at the output of AND gate 217 providing the buffer queue length is in excess of 20 percent. This digital pulse at the output of AND gate 217 is coupled through AND gate 221 to the control input of switch 225. The difference between the digital word present on bus 110 and the digital word present on bus 211 is, of course, available at the output of subtractor circuit 210. As pointed out hereinabove, this difference digital word on bus 212 represents the change in video amplitude which has taken place at spatial point 2 in FIG. 4. The difference digital word on bus 212 is coupled to the input of a divider circuit 231. By dividing the difference digital word on bus 212 by an integral value of two, divider circuit 231 provides a digital word on bus 232 at the input of switch 225 whose value equals 50 percent of the difference in picture element amplitudes for the value currently present at point 2 and the value previously stored for point 2 in FIG. 4. The energizing pulse from gate 221 activates switch 225 so as to couple the digital word present on bus 232 through to the inputs of addition circuits 223 and 228. As a result, 50 percent of the detected difference at spatial point 2 is added to the stored picture element amplitudes for the spatial points designated as 1 and 3 in FIG. 4.

Although the entire difference or a fractional part of the difference other than 50 percent may, of course, be added to the stored picture element amplitudes, a value of 50 percent has been found to be particularly advantageous for the reasons which follow. If during the next video line of the odd field the spatial point below spatial point 2, which is designated as point 4 in FIG. 4, is detected to also have a significant change in amplitude, 50 percent of point 4's detected difference will also be added to the stored picture element amplitude for point 3. This will be possible since the stored amplitude for point 3 is available at the output of delay circuit 227 when the new and stored amplitudes for point 4 are being tested for the purpose of detecting a significant change. With point 3 receiving both 50 percent of the detected change from point 2 and 50 percent of any detected change from point 4, a rather good predicted value is established for point 3 under most circumstances. If, on the other hand, point 4 is determined to not have a significant change in video amplitude, the 50 percent detected change added to spatial point 3 will simply provide a smooth transition between point 2 and point 4 in the video image.

This technique of adding fifty percent of the detected change to the picture element amplitudes for the spatial points above and below the spatial point under consideration works extremely well under most circumstances where the video amplitudes for these adjacent spatial points all have relatively close values for their picture element amplitudes. If the 50 percent addition method is used in both field replenishments however, a large error in a point in one field would be propagated into the next field. This error in turn causes replenishment at the next field time, putting the error back into the first field again. Thus, a busyness in replenishment results, that is, an oscillation in the replenishment cycle which would load the system unnecessarily. In accordance with the present invention, the 50 percent addition method is utilized during the odd fields only. During the even fields, adjacent spatial points are predictively updated by replacing their amplitude values in the frame memory by the entire amplitude of the spatial element from the even field presently under consideration. By requiring high threshold levels during the even fields, the odd fields take precedence and oscillations of the type described are avoided.

Figure 5:
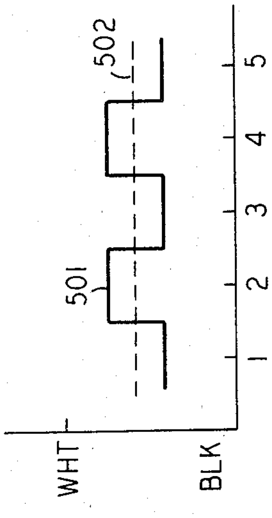

An example of one circumstance under which the 50 percent technique in both fields does not work well is where a highly detailed pattern is present in the video image. This highly detailed pattern may be represented by the video amplitudes shown in FIG. 5 for spatial points 1 through 5. In FIG. 5, curve 501 shows a set of picture element amplitudes for which spatial points 1, 3 and 5 have amplitudes representing a gray to black video signal whereas points 2 and 4 have amplitudes representing a much whiter video signal. If this pattern of amplitudes is stored in the frame memory and a movement occurs in the scene being viewed such that the new picture element amplitudes are represented by curve 502, the changes in amplitude present at points 2 and 4 will cause their picture element amplitudes to be entered into the buffer memory and, furthermore, will cause 50 percent of their detected changes to be added to the points 1, 3 and 5 (providing, of course, that the number of words stored in the buffer memory exceeds 20 percent of maximum buffer queue length). The change occurring at point 2 and at point 4 is a negative change in picture element amplitude for the coordinate system shown in FIG. 5. Fifty percent of these detected changes at points 2 and 4 when added to the stored picture element amplitudes for points 1, 3 and 5 will not bring these stored amplitudes closer to the video signal amplitude represented by curve 502 but, rather, will maintain the higher detailed pattern represented by curve 501. The entire pattern will simply be shifted in the black direction. To eliminate this difficulty, detected significant changes during the even fields are not permitted to introduce or update the picture element amplitudes of the odd fields by 50 percent of the detected change. Instead, as pointed out hereinabove, the new picture element amplitude for any spatial point which has undergone a significant change in the even field is entered into the frame memory for the adjacent spatial points of the odd field. In the example illustrated by FIG. 5, the highly detailed pattern will, of course, be introduced for one field time. During the even field, however, when spatial points 1, 3 and 5 are being tested for any changes in picture element amplitude, their new video amplitudes represented by curve 502 are used to determine the new values for spatial points 2 and 4 in the frame memory. As will be appreciated hereinafter, the spatial point from the odd field finally assumes the picture element amplitude of the spatial point in the even field memory below it in the spatial point format.

During the even field, a detected change which results in an energizing pulse on line 219 also results in an energizing pulse being coupled through AND gate 220 to the control inputs of switches 226 and 229. Presence of this energizing pulse at these control inputs causes the digital word on bus 110 to be coupled through to the outputs of these respective switches in place of the digital words present at the outputs of addition circuits 223 and 228. As a result, a detected change at spatial point 3 in FIG. 4 will cause the video amplitude from point 3 to be entered into the frame memory in place of the previously stored picture element amplitudes at spatial points 2 and 4, respectively.

As pointed out hereinabove, a spatial point in the even field can be updated by 50 percent of the detected changes in the spatial points above and below it in the spatial point format. Under most circumstances, this updated value in the frame memory will not differ significantly from the true amplitude value subsequently presented on bus 110. As a result, it will not be necessary to transmit the new picture element value since this predictive updating is caused to occur at both the transmitting and receiving ends of the system.

If both fields had identical threshold levels, however, the value achieved by adding 50 percent of the difference detected during the odd fields will still under some circumstances result in a detectable difference for the updated spatial points during the even fields. If this detectable difference exceeds the threshold level established by threshold circuit 213, new amplitude values will be inserted into the frame memory for the stored amplitudes corresponding to spatial point elements in the odd fields. This in turn could, of course, create significant differences for the spatial points in the odd field. As a result, a circular or unstable condition can be created depending primarily on the sort of changes that have taken place in the video amplitudes. To reduce the number of unstable conditions that are created in this way, the odd fields are chosen as the fields for which a most nearly correct video image will be presented. The even fields will generally be approximated by the values that are achieved in accordance with the 50 percent addition of detected differences obtained from the odd fields. To insure that errors created in the even fields will not be likely to create unstable conditions, the threshold values required for detected differences during the even fields are caused to be greater than the threshold values for differences detected during the odd fields. As shown in FIG. 3, these higher threshold values for the detected differences during the even fields are higher for all of the buffer queue lengths in excess of 20 percent. Threshold circuit 213 provides these higher threshold values during the even fields in response to the energizing signal provided on line 104 by sync detector 103.

The energizing signal provided on line 219 which produces a predictive updating of frame memory 201 is also coupled by way of line 219 to the set input of flip-flop 121 in FIG. 1. This flip-flop 121 is reset to its zero position by each voltage pulse produced on line 109 by clock generator 108. If no energizing signal is produced on line 219, the logical "0" which is present on line 128 at the output of flip-flop 121 is available for coupling into the buffer memory as the eighth bit of the address word. This writing into the buffer memory even though an energizing signal is not produced on line 219 occurs when the buffer queue length is less than 20 percent and the video amplitude represented by the digital word on bus 110 is found to represent a significant change in amplitude. If, however, the buffer queue length is in excess of 20 percent and, furthermore, the digital word on bus 110 is found to represent a significant change in amplitude, flip-flop 121 is set by an energizing pulse on line 219, and the resulting logical "1" present on line 128 is coupled into the buffer memory as the eighth bit of the address word.

The receiver which must be constructed in order to operate with the transmitter shown in FIGS. 1 and 2 is identical to the receiver described in the above-mentioned patent to Frank W. Mounts except for the frame memory, which must be modified so as to permit predictive updating of samples stored within the frame memory. The frame memory apparatus in the receiver is identical to the apparatus disclosed in FIG. 2 of the drawings. Gates in the receiver equivalent to gates 220 and 221 of FIG. 2 are provided with the eighth bit of the digital word representing the address. If the eighth bit is a logical "0", neither of these receiver gates will be energized and, therefore, no predictive updating is caused to occur in the receiving frame memory. If, on the other hand, the eighth bit of the address word is a logical "1", one of the gates (the particular one chosen being dependent upon whether an odd or an even field is being replenished) is energized by this logical "1" so as to permit an updating of spatial points within the receiving frame memory. As is pointed out in the prior art patents, a subtractor circuit within the receiver will provide a difference word identical to that which is provided within the transmitting apparatus since the amplitude values stored within the receiving frame memory are caused to be identical to those which are stored within the transmitting frame memory.

What has been described hereinabove is a specific illustrative embodiment of the present invention. Numerous modifications may, of course, be made by those skilled in the art without departing from the spirit and scope of the present invention.

I claim:

1. Redundancy reduction apparatus for use with a video signal having intervals called frames and subintervals called fields, said apparatus comprising means for generating samples of said video signal, each of said samples corresponding to a spatial point in a frame interval, frame memory means for storing an entire frame of video samples, means for comparing a generated video sample with a sample from said frame memory means corresponding to the same spatial point, means responsive to said comparing means for generating an energizing signal in response to a difference between said generated sample and said sample from said frame memory means, means responsive to said energizing signal for changing the value of the sample in said frame memory means corresponding to said same spatial point, a buffer memory means for storing said generated sample in response to said energizing signal, means for counting the number of samples stored in said buffer memory means, and means responsive to said counting means and to said energizing signal for changing the values of samples stored in said frame memory means corresponding to spatial points other than said same spatial point.

2. Redundancy reduction apparatus as defined in claim 1 wherein said means for changing the values of samples stored in said frame memory means includes means for coupling a predetermined portion of the difference between said generated sample and said sample into said frame memory means.

3. Redundancy reduction apparatus as defined in claim 1 wherein said means for changing the values of samples stored in said frame memory means includes means for coupling said generated sample into said frame memory means.

4. Redundancy reduction apparatus as defined in claim 1 wherein said apparatus further includes a means responsive to said video signal for indicating at least two different field subintervals; and said means for changing the values of samples stored in said frame memory means includes means for coupling a predetermined portion of said difference between said generated sample and said sample from said frame memory means into said frame memory means when one of said field subintervals is indicated, and means for coupling said generated sample into said frame memory means when another of said field subintervals is indicated.

5. Redundancy reduction apparatus as defined in claim 4 wherein said means for generating an energizing signal is a threshold circuit responsive to said means for indicating at least two different field subintervals, whereby larger differences are required to exist during one of said field subintervals before an energizing signal is produced.

6. Redundancy reduction apparatus as defined in claim 1 wherein said frame memory means includes at least a first, second and third delay circuit means connected in tandem.

7. Redundancy reduction apparatus as defined in claim 6 wherein said means for changing the values of samples stored in said frame memory means includes means for adding a fractional part of said difference to samples available at the output of said first and second delay circuit means.

8. Redundancy reduction apparatus as defined in claim 6 wherein said means for changing the values of samples stored in said frame memory means includes means for replacing samples at the outputs of said first and second delay circuit means by said generated sample.

9. Redundancy reduction apparatus as defined in claim 6 wherein the apparatus further includes a means responsive to said video signal for indicating at least two different field subintervals; and said means for changing the values of samples stored in said frame memory means includes means for adding a fractional part of said difference to samples available at the output of said first and second delay circuit means in response to an energizing signal during one of said field subintervals, and means for replacing samples at the outputs of said first and second delay circuit means by said generated sample in response to an energizing signal during another of said field subintervals.

10. Redundancy reduction apparatus as defined in claim 9 wherein said means for generating an energizing signal is a threshold circuit responsive to said means for indicating at least two different field subintervals whereby larger differences are required during at least one of said field subintervals to produce an energizing signal.

11. A conditional replenishment video encoder for use with a video signal having frame intervals during which the amplitude of the video signal represents the information present at a plurality of spatial points, said encoder comprising means for sampling said video signal, frame memory means for storing an entire frame of video samples, means for comparing each newly generated sample with a corresponding sample from said frame memory means having the same spatial point location, buffer memory means for storing said newly generated sample in response to an indication from said comparing means that a significant difference exists, means responsive to said comparing means and to said buffer memory means for changing the values of samples stored in said frame memory means which correspond both to said same spatial point and to at least one spatial point other than said same spatial point when the buffer memory means is storing in excess of a predetermined number of samples.

12. An encoder as defined in claim 11 wherein the means for changing values of samples in said frame memory means includes means for coupling a portion of the difference between said newly generated sample and said sample stored in said frame memory means into said frame memory means.

13. An encoder as defined in claim 11 wherein said means for changing the values of samples in said memory means includes means for coupling said newly generated sample into said frame memory means to change the value of said at least one spatial point other than said same spatial point.

14. An encoder as defined in claim 11 wherein the video signal has at least two field subintervals and the encoder further includes a means for indicating which one of the two field subintervals is presently represented by said video signal, and the means for changing the values of samples in said frame memory means is responsive to said field indicating means whereby a predetermined part of said difference is coupled into said frame memory means during one field subinterval and said newly generated sample is coupled into said frame memory means during the other one of said field subintervals.

15. An encoder as defined in claim 14 wherein said means for coupling the difference includes a divider circuit for producing fifty percent of the difference between said newly generated sample and said sample stored in said frame memory means.

* * * * *